No. 892,833.

PATENTED JULY 7, 1908.

E. G. HOWARD.
MOTOR VALVE MECHANISM.
APPLICATION FILED MAY 15, 1902.

2 SHEETS—SHEET 1.

Witnesses:
J. D. Garfield
F. A. Cutter.

Inventor:
Ernest G. Howard
by Webster, Taft & Tilley
Attorneys.

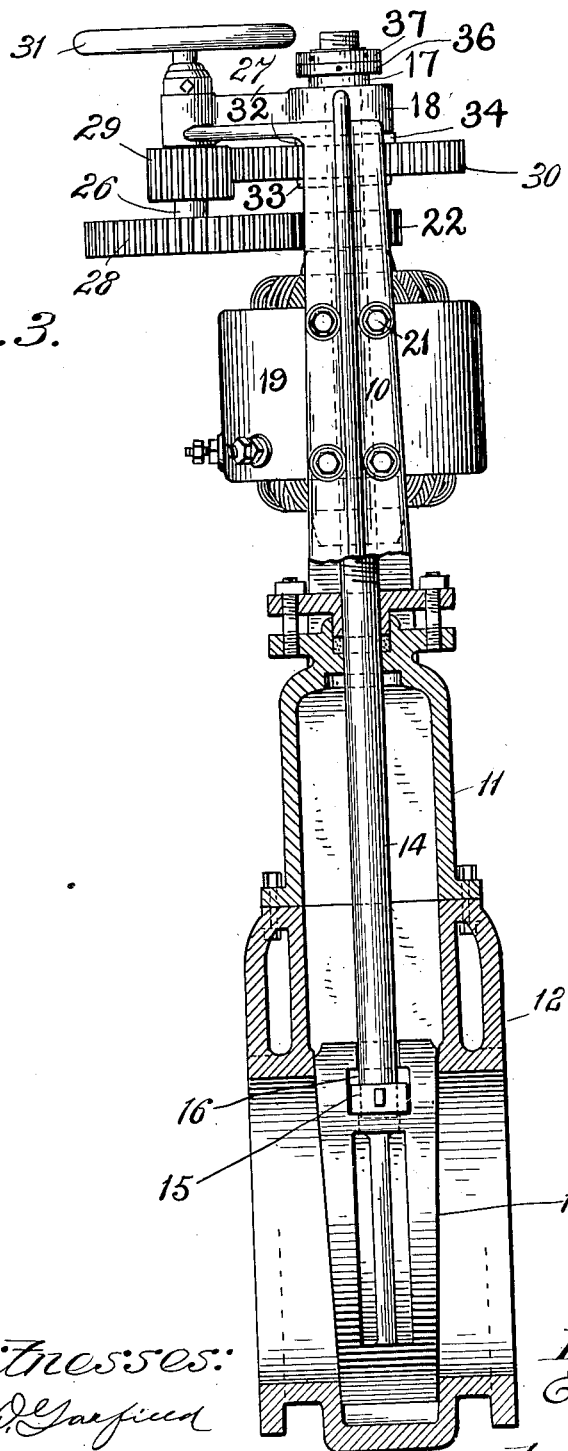

UNITED STATES PATENT OFFICE.

ERNEST G. HOWARD, OF SPRINGFIELD, MASSACHUSETTS, ASSIGNOR TO CHAPMAN VALVE MANUFACTURING COMPANY, OF SPRINGFIELD, MASSACHUSETTS, A CORPORATION OF MASSACHUSETTS.

MOTOR-VALVE MECHANISM.

No. 892,833.          Specification of Letters Patent.          Patented July 7, 1908.

Application filed May 15, 1902. Serial No. 107,457.

To all whom it may concern:

Be it known that I, ERNEST G. HOWARD, a citizen of the United States, residing at Springfield, in the county of Hampden and Commonwealth of Massachusetts, have invented new and useful Motor-Valve Mechanism, of which the following is a specification.

My invention relates to improvements in mechanism for opening and closing the plug or gate of valves, and more particularly to electric motors and mechanism for transmitting power therefrom to the plug or gate, in which the motor is provided with a hollow armature shaft through which the valve spindle extends, said motor being centrally located relative to the longitudinal center of the valve casing or frame; and the objects of my improvement are, first, to secure compactness and space economy in motor-driven valve construction; second, to afford means for locating the motor in a central position in the yoke instead of at one side of the yoke or casing as formerly; third, to render the transmission of power from a motor so placed, effective in every particular; and, fourth, to provide a motor and mechanism which are applicable to any of the well-known forms of water, steam, or other valves, having an outside or inside screw. I attain these objects by the means illustrated in the accompanying drawings, in which—

Figure 1:
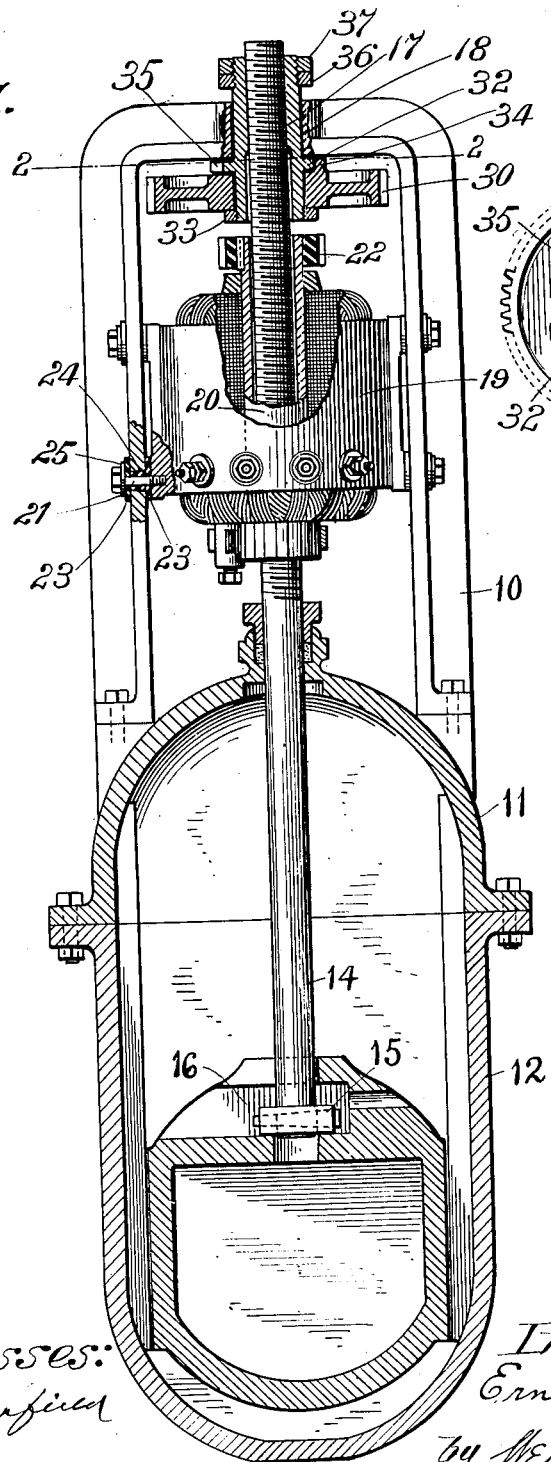
Figure 2:
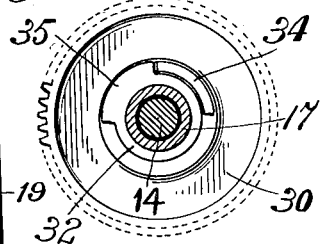

Figure 1 is a vertical section of a valve embodying my invention, the motor being partly in elevation; Fig. 2, a plan view of one of the lost motion devices that I prefer to use, the sleeve and valve spindle being in section; and Fig. 3, a side elevation and partial section of said valve.

Although my invention is applicable to valves without the introduction of lost motion devices into the mechanism, by employing such devices a much smaller motor can be used, because, more power being required to unlock the screw and start the gate, either to raise or lower the same, than is needed for the performance of the subsequent work of opening or closing it, it is possible and practical to supply power necessary for all purposes with a small motor, by resorting to the aforesaid lost motion devices. By providing a suitable lost motion device or devices between the motor and gate end of the spindle, the small motor is enabled to gather sufficient momentum to overcome the initial resistance.

Valves are divided into two classes, one in which an outside screw is used and the other in which an inside screw is used. The outside screw construction comprises a spindle threaded at its upper or outer terminal to engage a revolving spindle nut or sleeve, and the inside screw construction comprises a spindle threaded at its lower or inner terminal to engage the gate. In the first instance the spindle travels and carries the gate with it, and in the second instance the spindle has no longitudinal movement, but the gate moves up or down on the same. This invention relates more particularly to the outside screw construction.

Spur gears are shown and described, but it will be understood that other mediums for transmitting motion may be used, as worm or bevel gears, chain and sprockets, or any other practical mechanical equivalents.

Similar figures refer to similar parts throughout the several views.

The valve casing or frame comprises a yoke 10 mounted on a cap 11 which is in turn mounted on a body 12. A plug or gate 13 is seated in the body 12 and may be raised to the top of the cap 11, by means of an outside spindle 14. The spindle 14 is securely attached directly to the gate 13, or it may be attached to a non-rotary block 15 which has a certain amount of vertical movement in a slot 16 in said gate and constitutes one of the means for obtaining lost motion. The block 15 prevents the spindle 14 from turning. The spindle 14 passes through a suitable stuffing-box and follower at the top of the cap 11, and the threaded terminal of said spindle is engaged by a rotary sleeve 17 in the yoke head 18.

An electric motor 19 of any suitable construction, having a hollow armature shaft 20 through which the spindle 14 passes, is fastened between the legs of the yoke 10 by some suitable means as the bolts 21. The motor with a hollow armature shaft, constitutes an essential and valuable feature of my invention. A small gear or pinion 22 is fast on the upper end of the armature shaft 20 and should be made wholly or in part of some insulating material as raw-hide. The insulating pinion 22 and the insulating washers 23 23 and bushing 24 around each bolt 21, completely insulate the motor 19 from the surrounding and adjacent parts. A metallic washer 25 may be introduced between each bolt head and the adjacent washer 23.

In both the outside and inside screw constructions, intermediate shafts and gears are employed to transmit power from motor to spindle, and I show a vertical intermediate shaft 26 journaled in an arm 27 projected forward from the yoke head 18, fast on the lower end of which is a gear 28 meshing with the pinion 22. Above the gear 28 is a small gear or pinion 29 fast on the shaft 26 and meshing with a gear 30 loose on the sleeve 17. A hand-wheel 31 is mounted on the top of the shaft 26 for operating the gate mechanism when the motor is not in use. This hand-wheel may be large enough to serve also as a balance wheel for the motor and is very useful in such a capacity, especially with large valves.

The gear 30 is held loosely to the sleeve 17 by and between a flange 32 above and a nut 33 below said gear, said nut being screwed onto the lower threaded end of said sleeve while said flange is preferably integral therewith. Thus the gear 30 has no vertical movement independent of the sleeve 17. A lost motion device is introduced at this point, consisting of a clutch projection 34 rising from the top of the gear 30, and a clutch projection 35 extending from the periphery of the flange 32 into the path of travel of said projection 34. The operation of this lost motion device will be hereinafter explained.

The sleeve 17 is loosely held in the yoke head 18 by and between the sleeve flange 32 below and a nut 36 above said yoke head, the nut 36 being held in place by a second nut 37 both of which are received onto the upper threaded terminal of said sleeve. The flange 32 and nut 36 do not embrace the yoke head 18, but are separated sufficiently to permit the sleeve 17 to move up and down and thus afford means for still another lost motion presently to be explained. The sleeve 17 carries the gear 30 with it in its vertical movement, and the pinion 29 should be wide enough, in this case, to permit of such movement on the part of said gear and still be in mesh therewith at all times.

Assuming that the parts stand as shown in the drawings, the operation is as follows:—
The electric current is turned on to start the motor shaft 20 and rotate it to the left and said shaft revolves freely outside of the spindle 14 and transmits rotary motion in the same direction to the gear 30 through the medium of the pinion 22 and the intermediate shaft and gears hereinbefore fully described. The gear 30 makes one half of a revolution before its clutch projection 34 contacts with the sleeve clutch projection 35 when the sleeve 17 is rotated and the first lost motion is taken up. The sleeve 17 which before was locked to the spindle 14 with its flange 32 jammed against the bottom of the yoke head 18, has now been unlocked and runs down said spindle until the nut 36 strikes the top of said yoke head, the first lost motion having been sufficient to enable the motor to gather adequate momentum to overcome the frictional resistance offered by the locked sleeve. At the instant the nut 36 strikes the yoke head the sleeve 17 begins to act on the spindle 14 to raise the same, and the second lost motion has been taken up. The spindle 14 travels upward without affecting the gate 13, until the block 15 rises from the bottom to the top of the slot 16 when said gate is forced out of the wedged position which it assumes when closed, and begins to rise with the block and spindle, the motor having gathered momentum enough by the time the third lost motion is taken up to do this work successfully. The third lost motion begins when the block 15 leaves the bottom of the slot 16 and ends when it reaches the top of said slot. The spindle and gate now continue on their upward course until the latter encounters the top of the cap 11 when all motion ceases. The valve is now open.

To close the valve, reverse the motor to revolve the shaft 20 to the right, and with it the gear 30 which takes up the first lost motion and unlocks the sleeve 17 from the spindle, next said sleeve travels up on said spindle until the second lost motion is taken up by contact between the flange 32 and the yoke head, then said sleeve depresses the spindle until the third lost motion is taken up by means of the block 15 in the slot 16, when the gate is lowered into its closed position and further movement ceases.

When the gate is opened and closed the spindle 14 travels up and down freely through the armature shaft 20.

It will be readily understood that one or more of the lost motion devices may be omitted from either construction, but if all of them are omitted in any instance, a much larger motor is required in order that the initial resistance may be overcome, than is necessary when such a device or devices are employed. If the clutch projections are dispensed with, the gear 30 must be fast, instead of loose, on the sleeve 17, and this is the case in the event that all of the lost motion devices are omitted. By a construction which brings both the flange 32 and the nut 36 into contiguity with the yoke head at the same time, the second lost motion is done away with, whether the others are used or not. And by attaching the spindle 14 directly to its gate, the remaining lost motion is eliminated. From the foregoing it will be seen that the lost motion devices may be combined in various ways. It is obvious too, that certain constructive modifications can be made in these devices, such as will occur to one skilled in the art.

The hand wheel 31 is used to open or close the gate when, for any reason, it is not possible or desirable to employ the motor, and may also serve in the capacity of a balance wheel for the mechanism. It may be turned until the lost motions are taken up, when it operates in the usual manner.

As shown in the several figures, slot 16 which receives the block 15 or 15ª is formed in the upper side of the gate and the openings into the slot are through the periphery of the gate. When the gate is seated, as shown in the several figures, its two faces completely shut off communication between the pipe or conduit on either side of said gate and the interior of the shell or valve casing; hence, the block 15 or 15ª is protected by its location in the slot 16 from the pressure of the fluid controlled by the valve, when the gate is seated.

I do not seek to claim broadly the lost motion devices herein set forth, having done so in a previous application, Serial Number 100,699, filed March 31st, 1902, but What I do claim as my invention, and desire to secure by Letters Patent, is—

1. The combination in a motor valve mechanism, of a valve body, an electric motor having a hollow armature shaft, a threaded non-rotary, reciprocating valve spindle extending through and free from such shaft, a rotary sleeve in threaded engagement with the spindle, gearing for transmitting motion from said shaft to said sleeve, a gate arranged in the valve body and having a lost-motion connection with the spindle, and a wheel mounted in operative engagement with said gearing, such wheel serving as a balance wheel when the motor finishes the power and as a hand wheel when the power is applied by hand.

2. The combination in a valve motor mechanism, of a motor having a rotating hollow shaft, a non-rotating, reciprocating valve spindle threaded at one end portion and extending through and free from such shaft, means for imparting longitudinal motion to said spindle from said hollow rotating shaft, a slotted gate, a block fixed to said spindle and seated within the slot in said gate, said block being of less thickness than the height of the slot in which it is located, and means for preventing rotation of the block, said block being protected by its location within the slot from the pressure of the fluid controlled by the valve, when said valve is seated.

3. The combination with a hollow armature shaft of a motor, of a non-rotary valve spindle extending through and free from such shaft and threaded at one terminal, a longitudinally movable sleeve engaging such threaded terminal to move said spindle longitudinally after the lost motion of the sleeve is taken up, means to limit such movement of the sleeve, means to impart rotary motion to said sleeve from the hollow shaft, and a member mounted to serve as a balance wheel or a hand wheel for manually operating the sleeve and spindle.

4. The combination, in motor valve mechanism, with a hollow armature shaft of a motor, of a valve spindle extending through such shaft and threaded at one terminal, a longitudinally movable sleeve engaging such threaded terminal, means to limit such movement of the sleeve, a clutch projection on said sleeve, a gear rotatably loose on the sleeve but held against independent axial movement and provided with a clutch projection adapted to engage the sleeve clutch projection, and means to transmit power from the hollow shaft to said gear.

5. The combination with a hollow armature shaft of a motor, of a valve spindle extending through such shaft and threaded at one terminal, a longitudinally movable sleeve engaging such threaded terminal, means to limit such movement of the sleeve, a clutch projection on said sleeve, a gear rotatably loose on the sleeve but held against independent axial movement and provided with a clutch projection adapted to engage the sleeve clutch projection, means to transmit power from the hollow shaft to said gear, a slotted gate, a block fixed to the spindle in the gate slot, said block being of less height than such slot, and means to prevent the block from rotating.

In testimony whereof I have signed this specification in the presence of two subscribing witnesses.

ERNEST G. HOWARD.

Witnesses:
F. A. CUTTER,
STEPHEN S. TAFT, Jr.

It is hereby certified that in Letters Patent No. 892,833, granted July 7, 1908, upon the application of Ernest G. Howard, of Springfield, Massachusetts, for an improvement in "Motor-Valve Mechanism," errors appear in the printed specification requiring correction, as follows: In line 43, page 3, the word "finishes" should read *furnishes*, and in line 57, same page, the phrase "for preventing" should read *to prevent;* and that the said Letters Patent should be read with these corrections therein that the same may conform to the record of the case in the Patent Office.

Signed and sealed this 28th day of July, A. D., 1908.

[SEAL.]

E. B. MOORE,
*Commissioner of Patents.*